United States Patent
Murakami

[11] 3,752,015
[45] Aug. 14, 1973

[54] HYDRAULIC CONTROL SYSTEM FOR AUTOMATIC SPEED CHANGING DEVICES

[75] Inventor: Noboru Murakami, Kariya, Japan

[73] Assignee: Aisin Seiki Kabushiki Kaisha, Kariya-shi, Aichi-ken, Japan

[22] Filed: July 12, 1971

[21] Appl. No.: 161,549

[30] Foreign Application Priority Data
July 11, 1970 Japan.................................. 45/60758

[52] U.S. Cl. ................................................... 74/869
[51] Int. Cl. ............................................. B60k 21/00
[58] Field of Search ........................................ 74/869

[56] References Cited
UNITED STATES PATENTS
3,583,259  6/1971  Shimosaki............................ 74/869
3,633,439  1/1972  Annis.................................... 74/869
3,651,714  3/1972  Ohya et al. ........................... 74/869
3,667,323  6/1972  Irie........................................ 74/869

Primary Examiner—C. J. Husar
Attorney—Holman & Stern

[57] ABSTRACT

In an automatic speed changing device such as an automotive power transmission in which there is provided at least first friction engaging means to complete a low speed ratio power train therethrough and second friction engaging means to complete a high speed ratio power train and, a hydraulic control system therefor is equipped with a closely cooperating pair of pressure reducing valves. The fluid pressure being delivered as desired to the first and second friction engaging means from manual valve means for a shift from one speed ratio to another is controlled by the pressure reducing valves to prevent shocks due to the transition.

7 Claims, 7 Drawing Figures

HYDRAULIC CONTROL SYSTEM FOR AUTOMATIC SPEED CHANGING DEVICES

BACKGROUND OF THE INVENTION

This invention relates generally to speed changing devices, to hydraulic devices, and to automatic power transmissions for motor vehicles. More particularly, the invention relates to a new and advanced hydraulic control system for automatic speed changing devices of the fluid type that include, perhaps most importantly, automotive power transmissions.

PRIOR ART

Known automatic power tranmissions for motor vehicles usually combine a hydrodynamic unit such as a torque converter and a transmission gear proper, providing one or several forward drive power trains and one reverse drive power train therethrough. It is also well known that planetary gearing is incorporated in the majority of such automatic transmissions for its compactness and simplicity of operation. Further, there have been proposed varieties of systems for the control of the transmission or speed changing devices, and most hydraulic control systems currently in use include some means or other for engaging and disengaging selective combinations of one or several hydraulic clutches and one or several hydraulic brakes.

In order to complete a plurality of different speed ratio power trains through a single automatic transmission, several friction engaging devices have to be selectively operated. If, at the moment of transition from one speed ratio to another, different friction engaging devices required to establish the respective speed ratios are simultaneously set in operation, the entire transmission mechanism will be locked, producing a violent shock similar to that encountered upon overly rapid braking action. Should the friction engaging devices be both disengaged at the same time, on the other hand, the vehicle speed will not rise with an increase in engine speed even when the accelerator pedal is depressed. The operator will then experience an unpleasant slipping sensation.

What is important for preventing such undesirable effects is the proper control of transition from one (or several) friction engaging device to another (or others). To this end, the conventional control systems are equipped with orifice control valves, accumulators and the like connected in fluid passages to the actuating servomechanisms of the friction engaging devices. However, such prior antishock schemes are not yet completely satisfactory.

OBJECTS AND SUMMARY OF THE INVENTION

It is, therefore, an important object of the present invention to provide a new and advanced hydraulic control system for speed changing devices in general and for automotive automatic power transmissions in particular.

It is another important object of the invention to provide a hydraulic control system of the character referred to, which includes means for effecting smooth upshift and downshift transitions.

According to this invention, briefly summarized, there is provided a hydraulic control system for such a speed changing device as that comprising an input shaft, an output shaft, a plurality of selectively employable power trains between those shafts, and at least first and second friction engaging means adapted respectively for completing a lower and a higher speed ratio power train through the speed changing device, the first friction engaging means having an actuating chamber and a releasing chamber, and the second friction engaging means having a single actuating and releasing chamber.

The hydraulic control system for the speed changing device of the above character comprises a source of fluid pressure manual valve means for selectively engaging and disengaging the first and second friction engaging means in order to establish a desired power train, first fluid passage means between the actuating chamber of the first friction engaging means and a point of fluid discharge, a cooperating pair of pressure reducing valves disposed in the first fluid passage means for controlling the same, and second fluid passage means for directing to the pressure reducing valves the fluid pressure being delivered to the releasing chamber of the first friction engaging means and to the single chamber of the second friction engaging means. As the fluid pressure in the second fluid passage means rises to a predetermined level, the pressure reducing valves operate to temporarily open the first fluid passage means thereby to effect smooth shift transition.

The above and other objects, features and advantages of this invention will be more fully apparent from the following description when taken in connection with the accompanying drawings which illustrate a preferred form of the hydraulic control system of the invention as adapted to an automotive automatic transmission, and throughout which like reference numerals denote like parts.

DETAILED DESCRIPTION OF THE INVENTION

The hydraulic control system of the present invention hereinafter to be described in detail is adaptable, for example, to the automotive power transmission illustrated in FIG. 1 of the accompanying drawings. The transmission includes an input shaft 1, an output shaft 2 and intermediate shafts 3 and 4. The input shaft 1 is, in fact, an extension of the crankshaft of an automotive internal combustion engine 5, whereas the output shaft 2 is operatively connected to driving wheels 6 of the motor vehicle via suitable transmitting means. The intermediate shafts 3 and 4 are suitably installed between the input shaft 1 and the output shaft 2.

Figure 1:
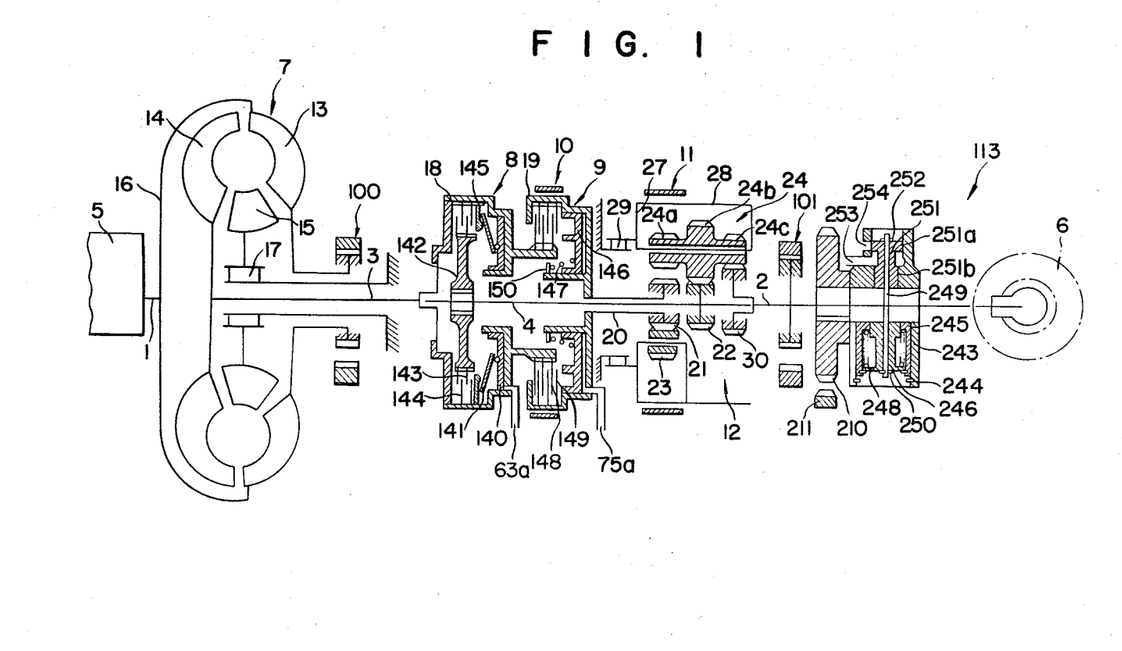
FIG. 1 is a schematic longitudinal sectional view of an automotive automatic transmission in which are to be incorporated the teachings of the present invention.

The transmission of FIG. 1 further includes a hydraulic torque converter 7, first and second hydraulic friction clutch means 8 and 9, first and second hydraulic friction brake means 10 and 11, and a planetary gear assembly 12. The hydraulic torque converter 7 comprises a pump wheel 13, a turbine wheel 14 and a stator wheel 15. The pump wheel 13 is driven by the input shaft or engine crankshaft 1 through a turning disk assembly 16. The turbine wheel 14 is splined with the intermediate shaft 3, and the stator wheel 15 is supported by means of a one way clutch 17 so as to be rotatable only in the rotational direction of the pump wheel 13.

The aforesaid intermediate shaft 3 is connected to a drum 18 of the first clutch means 8 and rotates in the same direction therewith. This clutch drum 18 serves as an inner hub of the second clutch means 9, while an inner hub 142 of the first clutch means 8 is fixed to the intermediate shaft 4. A sun gear 22 of the mentioned planetary gear assembly 12 also is fixedly mounted on this intermediate shaft 4 so as to be rotatable substantially integrally therewith. A drum 19 of the second clutch means 9 is keyed to a hollow sleeve 20, to which is fixed another sun gear 21, so that the clutch drum 19, the sleeve 20 and the sun gear 21 are rotatable together.

Rotatably mounted on a support 27 which is integral with a brake drum 28, a planet gear set 24 integrally combines first, second and third planet gears 24a, 24b and 24c having different numbers of teeth on their preipheries. Rotatably mounted again on the support 27 is another planet gear 23 which meshes with both the first planet gear 24a and the sun gear 21. The brake drum 28 is provided with a one-way clutch 29 so that the same is permitted rotation only in the rotational direction of the engine 5. The second planet gear 24b of the aforesaid set 24 meshes with the sun gear 22, whereas the third planet gear 24c meshes with a sun gear 30 which is substantially integral with the output shaft 2. The first and second friction brake means 10 and 11 (the numerals pointing to their friction bands) are respectively adapted to arrest the revolution of the clutch drum 19 (hence the sun gear 21) and of the brake drum 28 (hence the support 27).

Figure 3:
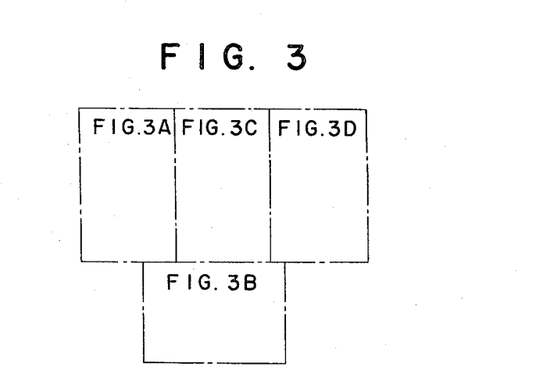
FIG. 3 shows the relative locations of FIGS. 3A through 3D in the overall hydraulic control system of FIG. 2.
Figure 3A:
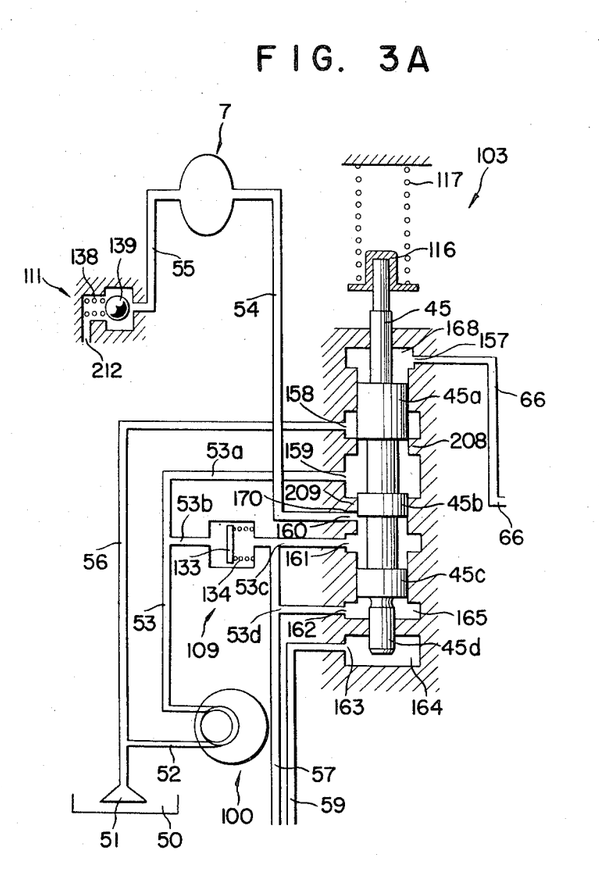
FIGS. 3A through 3D are enlarged schematic diagram, partly in longitudinal section, which constitute in combination a more detailed representation of the schematic diagram of FIG. 2.
Figure 3B:
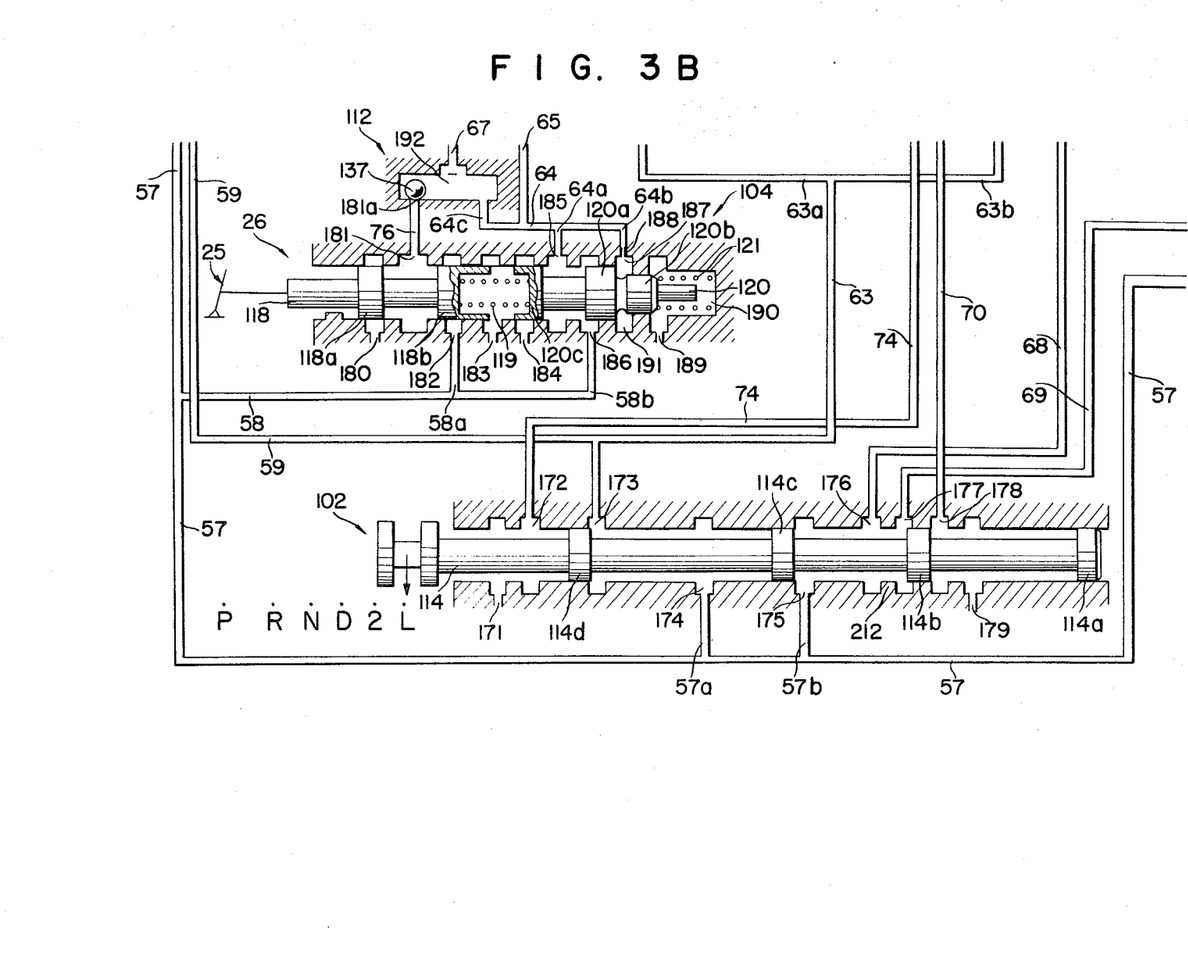

A manual valve assembly generally indicated by numeral 102 in FIG. 3B has six operative positions P (for Park), R (for Reverse), N (for Neutral), D (for Drive), 2 and L (for Low). Although to be described in greater detail later in this specification, the functions of this manual valve assembly 102 in relation to the automotive transmission of FIG. 1 will now be briefly explained.

With its valve piston 114 moved to the position N in a manner still to be described, the transmission is in its neutral condition. a low speed ratio between the input shaft 1 and the output shaft 2 of the transmission is obtained when the valve piston 114 is in the position L, whereas, when the valve piston has been manually downshifted to the position L from a high speed ratio condition of the transmission, an intermediate speed ratio is first realized which is gradually reduced to a low speed ratio with decrease in the vehicle speed. In the position 2, low and intermediate speed ratios are obtainable depending upon vehicle speed and engine throttle opening hereinafter to be described. In the position D and with small throttle opening, a so-called automatic change is effected from intermediate to high speed ratios and vice versa in step with vehicle speed. With medium or full throttle opening, on the other hand, similarly automatic change is carried out among low, intermediate and high speed ratios. In the position D and during vehicle rest, an intermediate speed ratio is provided. The valve piston 114 is to be shifted to the position R in event the vehicle is to be run rearward.

Referring back to FIG. 1, when the piston 114 of the manual valve assembly 102 has been moved to the position P by means of a shift lever (not shown), a detent or catch 211 engages an outer gear 210 which is keyed to the output shaft 2 of the transmission in accordance with the prior art. A low forward speed ratio is obtained in the positions L and 2 of the manual valve assembly 102 and at low vehicle speed, or, if the valve piston 114 is in the position D, at low vehicle speed and with medium or greater throttle opening. The other speed ratios are unobtainable with the valve piston 114 in the position L, unless the shift lever is operated.

Figure 3C:
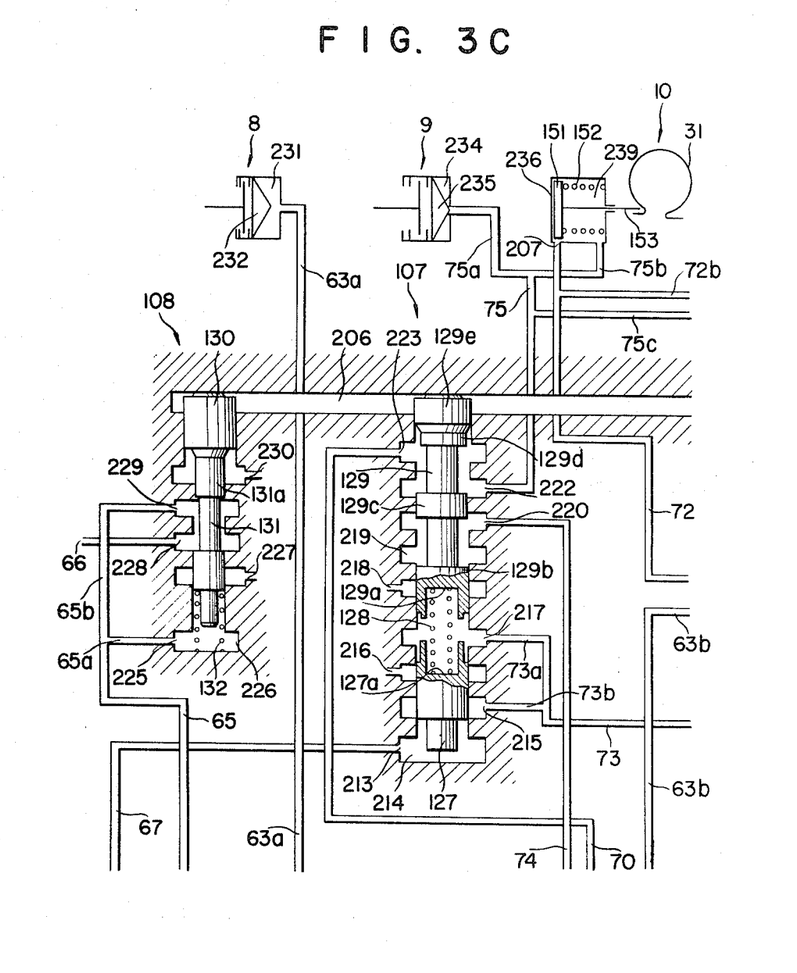
Figure 3D:
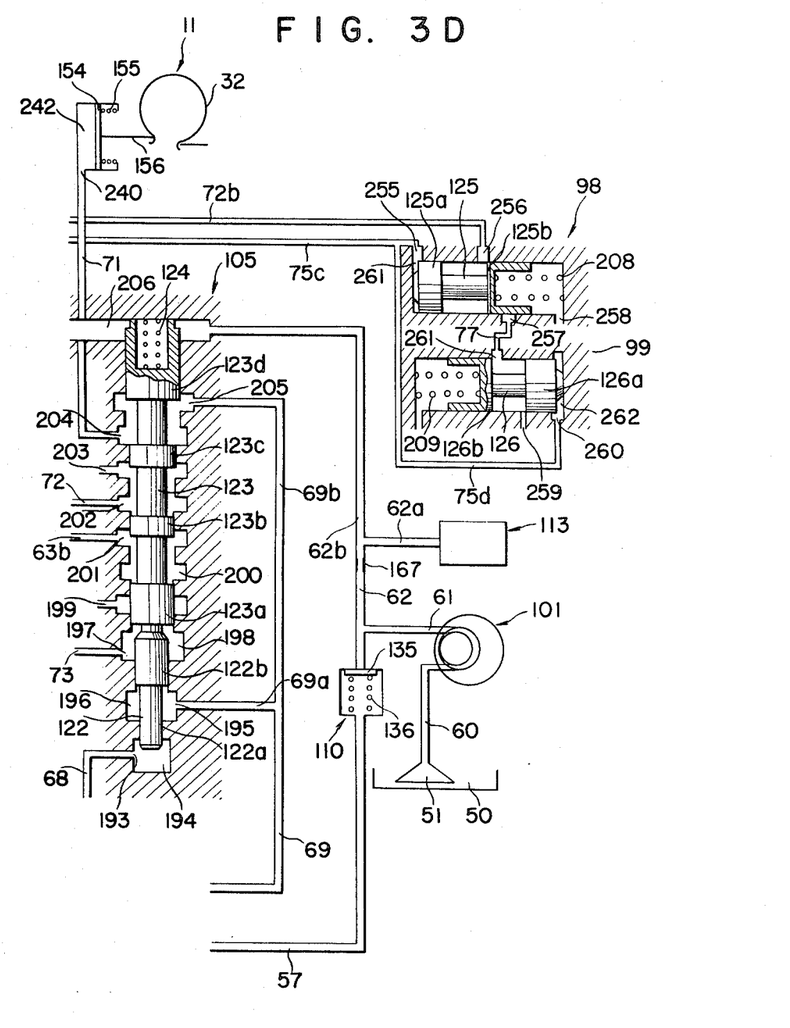

When, on one hand, the valve piston 114 is in the position L, the low speed ratio of the transmission is realized upon engagement of the first clutch means 8 and the second brake means 11 by applying hydraulic pressure to their respective pistons 140 and 154, the piston 154 of the second brake means 11 being shown in FIG. 3D. The low speed ratio realized in this instance is of two way drive. In the positions 2 and D, on the other hand, the low speed ratio is obtainable upon engagement of the first clutch means 8 alone by applying hydraulic pressure to its piston 140, as the one way clutch 29 operates in lieu of the aforesaid second brake means 11. The resulting low speed ratio is, therefore, of one-way drive.

The one-way clutch 29 has another important function. During an upshift from position L to position 2 or D of the manual valve assembly 102 following vehicle start-up, the second brake means 11 which has been completing a low speed ratio is disengaged, followed by the engagement of the first brake means 10 or of the second clutch means 9 to provide an intermediate or high speed ratio. Should any time lag occur in this transition, that is, if the second brake means 11 should be completely disengaged before proper engagement of the first brake means 10 or second clutch means 9, the consequent engine acceleration would result in considerable shock at the time of the delayed engagement thereof.

As is conventional with this kind of power transmission, however, the braking action that has been performed by the second brake means 11 is taken over by the one way clutch 29 upon initiation of its disengagement, the one way clutch 29 preventing undesired acceleration of the engine 5 until the first brake means 10 or the second clutch means 9 is properly engaged. More specifically, during the low speed ratio condition of the transmission, the one way clutch 29 like the second brake means 11 operates to prevent the support 27 from rotating in the direction opposite to that of engine rotation. The support 27 starts rotating in the same direction as that of engine rotation upon engagement of the first brake means 10 or the second clutch means 9, while the one way clutch 29 is automatically disengaged at a suitable moment. Hence smooth transition is accomplished from low to intermediate or high speed ratio.

The low speed ratio power train of this transmission is such that the rotation of the intermediate shaft 3 is conveyed through the first clutch means 8 to the other intermediate shaft 4, which then rotates the sun gear 22 as the driving element of the planetary gear assembly 12. The turning force thus delivered to the sun gear 22 is transmitted through the second and third planet gears 24b and 24c to the sun gear 30, so that now the output shaft 2 is rotated with a predetermined ratio of speed reduction between this output shaft 2 and the intermediate shaft 4. Inasmuch as the desired torque conversion has taken place in the hydraulic torque converter 7 and the planetary gear assembly 12, the torque or turning force given to the output shaft 2 is determined by the product of the respective torque ratios of the torque converter 7 and the planetary gear assembly 12.

The power train for the intermediate speed ratio of the transmission is completed as the second brake means 11 is released and the first brake means 10 is actuated while the first clutch means 8 is maintained in engagement. While the power train in this instance is substantially the same as in the aforementioned case of the low speed ratio condition, it is to be noted that now the sun gear 21 is retained immovable by means of the first brake means 10. The driving sun wheel 22 which rotates in unison with the intermediate shafts 3 and 4 meshes with the second planet gear 24b of the planet gear set 24; the sun wheel 30 which is rotated in unison with the output shaft 2 meshes with the third planet gear 24c; the first planet gear 24a of the same planet gear set 24 meshes with the planet gear 23 which is mounted on the same support 27 as is the planet gear set 24; and this planet gear 23 meshes with the sun gear 21. Inasmuch as the sun gear 21 is held immovable by the first brake means 10 as aforesaid, the support 27 underoges forward rotation. As a consequence, the sun gear 30 and therefore the output shaft 2 are driven with a predetermined reduction ratio (which is smaller than that in the event of the low speed ratio considered above) with respect to the intermediate shaft 4.

The intermediate speed ratio is obtained when the manual valve assembly 102, FIG. 3B, has been manually shifted to the position L from the high speed ratio condition of the transmission or, within certain ranges of vehicle speed and throttle opening, when the manual valve assembly 102 is set in the position 2 or D. In any of these positions L, 2 and D, however, transition from the intermediate to low speed ratio takes place as the vehicle speed decreases. While in the positions 2 and D, a shift to an intermediate speed ratio is possible with increase in vehicle speed, and no shift can be made to intermediate or high speed ratio in the position L.

The high speed ratio condition of the transmission is realized when the manual valve assembly 102 is set in the position D and when the vehicle speed is made sufficiently high. The power train through the transmission, in this instance, is obtained while the first clutch means 8 stays in its actuated position, by disengaging the first brake means 10 or the second brake means 11, and by actuating the second clutch means 9. This second clutch means 9 is actuable by delivering hydraulic pressure to its fluid chamber 234 (refer to FIG. 3C). In this high speed ratio condition, too, as in the precedingly discussed cases of low and intermediate speed ratios, the intermediate shaft 3 drives the sun gear 22 through the first clutch means 8. At the same time, however, the second clutch means 9 operates to couple the first clutch drum 18, which is coupled to the intermediate shaft 3, to the sun gear 21 through the second clutch drum 19. Hence the sun gears 21 and 22 are both driven at the same speed by the intermediate shaft 3, so that now all of the gear elements of the planetary gear assembly 12 are intermeshingly rotated, thereby realizing substantial direct drive between intermediate shaft 3 and output shaft 2. In so saying, it is taken for granted, as is generally admitted in the art, that the torque converter 7 works merely as a sort of fluid coupling when the transmission is in the high speed ratio condition.

The backward movement of the motor vehicle is also realizable by this transmission if its second clutch means 9 and second brake means 11 are both actuated. The power train in this instance includes input shaft 1, torque converter 7, intermediate shaft 3, second clutch means 9, sun gear 21, planet gear 23, first and third planet gears 24a and 24c of the planet gear set 24, sun gear 30 and output shaft 2. With the second brake means 11 brought into its actuated position, the support 27 operates as the reactive element of the planetary gear assembly 12, rotating in this instance in the forward direction. Since two planet gears 23 and 24 exist between the driving sun gear 21 and the driven sun gear 30, this sun gear 30 and hence the output shaft 2 are rotated in the reverse direction at a speed reduced from the revolving speed of the intermediate shaft 3 in a predetermined ratio. As is conventionally experienced, the torque converter 7 in this condition of the transmission operates to increase the torque of the engine crankshaft or input shaft 1, so that the torque actually conveyed to the output shaft 2 is the product of the increased amounts of torque of the converter 7 and the planetary gear assembly 12.

Lastly, in the neutral state of the transmission, in which the manual valve assembly 102 is set in the position N, all of the clutch means 8 and 9 and brake means 10 and 11 are unactuated. As best shown in FIG. 3C, the first brake means 10 is of such construction that its brake band 31 is operatively related with one end of a rod 153, the other end of which is connected to a piston 151 defining a pair of opposed fluid chambers 236 and 239, with a compression spring 152 being installed within the releasing fluid chamber 239. Delivery of hydraulic pressure to the actuating fluid chamber 236 causes the piston 151 to move rightward (as viewed in FIG. 3C) against the action of the compression spring 152 and hence results in the actuation of the brake band 31 by means of the rod 153. The hydraulic pressure supplied to the releasing fluid chamber 239, on the other hand, is itself balanced with the pressure of the first mentioned actuating chamber 236, but now, pressed by the spring 152, the piston 151 moves leftward in the drawing to release the brake band 31. The construction of the second brake means 11 is illustrated in FIG. 3D, its brake band 32 being actuated by means of a rod 156 which, in turn, is pressed by a piston 154 against a compression spring 155 upon delivery of hydraulic pressure to a fluid chamber 242.

It is believed that the foregoing description has made clear the construction of the automotive automatic transmission of FIG. 1 to which are adaptable the novel teachings of the present invention hereinafter to be described.

Figure 2:
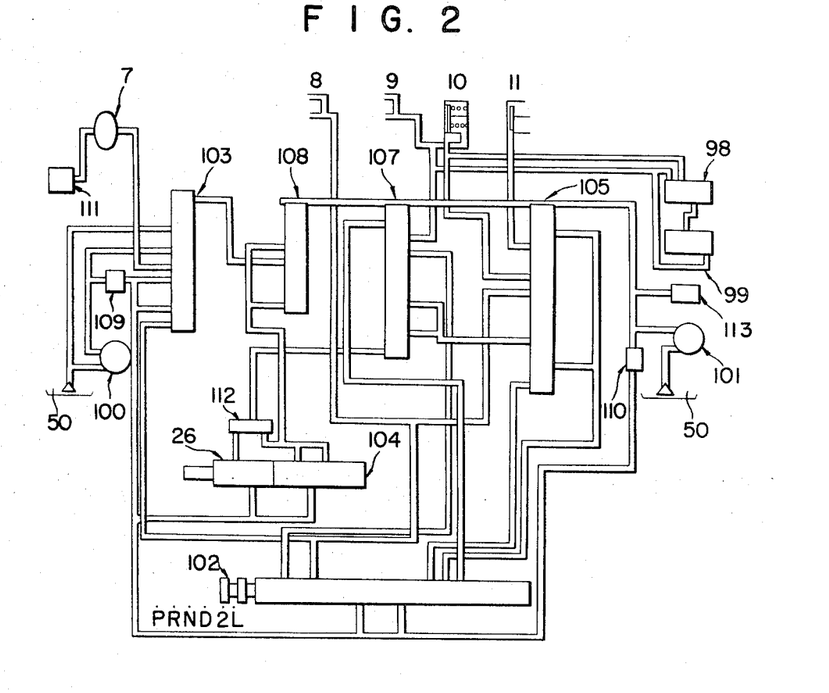
FIG. 2 is a schematic diagram showing a complete hydraulic control system for the automotive transmission of FIG. 1.

A hydraulic control system of the present invention, which is employable with the above described automotive transmission of FIG. 1, is schematically illustrated in FIG. 2. The system is broadly comprised of a front pump 100, a rear pump 101, a manual valve assembly 102, a pressure regulator valve assembly 103, a throttle valve assembly 104, a 1–2 shift valve assembly 105 (for changing the drive through the transmission between its first forward speed ratio and its second forward speed ratio), a 2–3 shift valve assembly 107 (for changing the drive through the transmission between its second and its third forward speed ratio), a throttle relay valve assembly 108, check valve assemblies 109 and 110, pressure reducing valve assemblies 98 and 99, and a governor valve assembly 113. The pumps 100 and 101 may be of any suitable construction only if they are capable of discharging predetermined amounts of fluid in a manner still to be described in detail, and may be of a type comprising inner and outer gears of conventional arrangement. As illustrated in greater detail in FIG. 3A, the front pump 100 draws fluid out of a sump 50 via filter 51 and inlet conduit 52, and discharges the same into an outlet conduit 53. This front pump 100 is driven by the transmission input shaft or engine crankshaft 1 via the pump wheel 13, as seen in FIG. 1.

With reference to FIG. 3D, the rear pump 101, which is driven by the transmission output shaft 2 (see also FIG. 1), sucks fluid from the sump 50 via filter 51 and inlet conduit 60 and discharges it to an outlet conduit 61. A conduit 57 seen in FIG. 3D carries line pressure to complete a desired power train through the transmission by actuating the aforementioned clutch and brake means as desired. The check valve assembly 110 is installed between this line pressure conduit 57 and the outlet conduit 61 of the rear pump 101. This check valve assembly comprises a valve member 135 resiliently pressed to its illustrated closed position by means of a spring 136, thereby shutting off the flow of fluid from the conduit 57 to the outlet conduit 61 and hence to the rear pump 101.

The other check valve assembly 109 of similar construction is illustrated in FIG. 3A, being connected to the conduit 53 in communication with the front pump 100. This check valve assembly 109 also comprises valve member 133 and spring 134 acting upon the former.

The pressure regulator valve assembly 103 shown in the same FIG. 3A operates to regulate the line pressure of the conduit 57 and hence to provide the correct pressures and flow requirements of this hydraulic control system. As illustrated the pressure regulator valve assembly 103 includes a valve piston 45 having lands 45a, 45b and 45c of the same diameter and another land 45d of smaller diameter than the preceding three lands. A spring 117 received on one end by a support 116 forces the valve piston 45 downward as viewed in the drawing. The pressure regulator valve assembly 103 further includes ports 157, 158, 159, 160, 161, 162 and 163. The ports 161 and 162 communicate with the conduit 57. The port 159 communicates with an extension 53a of the outlet conduit 53 of the front pump 100. The port 158 communicates with a conduit 56 which in turn is in communication with the inlet conduit 52 of the same front pump. The port 160 is formed into a somewhat narrowed orifice 170 through which the port is communicated with the torque converter 7 via conduit 54. By adequately selecting the size of the orifice 170, a desired amount of hydraulic pressure will be delivered to the torque converter 7.

The governor valve assembly 113 illustrated in FIG. 1 is a speed sensitive, regulating valve adapted to provide a pressure that varies in relation to vehicle speed. The governor valve assembly 113 includes a casing 243 fixedly mounted on the transmission output shaft 2, a valve piston 251 slidably installed in the casing, inner and outer governor weights 246 and 245, and a spring 248 effectively installed between the weights 245 and 246. Excessive outward displacement of the aforesaid valve piston 251 and weights 245 and 246 during operation is prevented by means of a rod 249 passing traversely through the output shaft 2 to interconnect them. This rod 249 is held in position by suitable fixtures 250 and 252. The valve piston 251 has lands 251a and 251b of larger and smaller diameters, respectively. The casing 243 has ports 253 and 254, the port 253 communicating with the outlet conduit 61 of the rear pump 101 via conduit 62a and conduit 62 having orifice 167 (refer to FIG. 3D) and the port 254 communicating with the aforesaid sump 50.

The throttle valve assembly 104 in FIG. 3B is actuable by the accelerator pedal 25 of the motor vehicle to vary the shift points of the transmission and to change the pressures applied to its clutch and brake means described already. The throttle valve assembly 104 is controlled by a downshift valve assembly 26 which includes a valve piston 118 having lands 118a and 118b, and ports 180, 181 and 182. The port 180 is for fluid discharge. The port 181 communicates with a port 181a of a check valve assembly 112 whose valve chamber 192 communicates with a port 213 of the 2-3 shift valve assembly 107 via conduit 67 as hereinafter to be described. And the port 182 of the downshift valve assembly 26 communicates with the aforesaid conduit 57 through conduits 58a and 58. The valve piston 118 is operatively connected to the accelerator pedal 25 through a suitable system of linkages, whereby, as the pedal is moved to its open throttle position, the valve piston 118 moves right-ward as seen in FIG. 3B. As is conventional with motor vehicles, the accelerator pedal 25 on the other hand is suitably linked to the engine carbureter not illustrated in the drawings.

The throttle valve assembly 104 under the control of the above described downshift valve assembly 26 includes a valve piston 120 having lands 120a, 120b and 102c, and ports 183, 184, 185, 186, 187 and 189. A spring 119 is installed between the valve pistons 118 and 120, whereas another spring 121 is installed on the right hand side of the piston 120 against the first mentioned spring 119. The ports 183, 184 and 189 of the throttle valve assembly 104 are for fluid discharge. The port 186 communicates with the conduit 57 through conduits 58b and 58. The port 187 is formed into an orifice 188 and communicates with the port 185 of the same throttle valve assembly through conduits 64b and 64a. The conduits 64a and 64b communicate with a conduit 64 which separates into conduits 64c and 65. The conduit 64c leads to the aforesaid valve chamber 192 of the check valve assembly 112 and thence to the chamber 214 of the 2–3 shift valve assembly 107 via the conduit 67 (refer to FIG. 3C). The conduit 65, on the other hand, leads to the ports 225 and 229 of the throttle relay valve assembly 108 (refer also to FIG. 3C).

The throttle relay valve assembly 108 of FIG. 3C includes a valve piston 130 serving as a substantial plug, so to say, another piston 131 having lands 131a and 131b of the same diameter, ports 225, 227, 228, 229 and 230, and valve chambers 226 and 206. The ports 227 and 230 are for fluid discharge. The ports 225 and 229 communicates with the ports 185 and 187 of the throttle valve assembly 104 as above mentioned. The port 228 communicates with the port 157 of the aforesaid pressure regulator valve assembly 103 via conduit 66. A spring 132 installed within the valve chamber 226 acts on the piston 131 which is thereby pressed to the piston 130 against governor pressure within the chamber 206.

The 2-3 shift valve assembly 107 illustrated in the same FIG. 3C includes valve pistons 127 and 129, and a spring 128 installed therebetween to urge the valve pistons in the opposite directions. The valve piston 127 has a seat 127a for the spring 128 on one end thereof, whereas the valve piston 129 has a similar spring seat 129a. The valve piston 129 is further formed with lands 129c and 129d of the same diameter, a land 129e of larger diameter, and a land 129b of smaller diameter than the foregoing two lands 129c and 129d. The 2-3 shift valve assembly 107 also comprises ports 213, 215, 216, 217 218, 220, 222 and 223, and valve chambers 206, 214 and 219. The ports 216 and 218 are discharge ports leading to sump 50. The port 213 communicates with the ports 185 and 187 of the throttle valve assembly 104 through conduit 67, check valve assembly 112, and conduits 64c, 64,64a and 64b (refer also to FIG. 3B). The ports 215 and 217 intercommunicate via conduits 73a and 73b. The chamber 219 is simply recessed for convenience in machining the bore and has no other function at all. The port 220 communicates with the port 172 of the aforesaid manual valve assembly 102 through conduit 74 (refer also to FIG. 3B). The port 222 communicates with the chamber 234 of the second clutch means 9 through conduits 75 and 75a on one hand and, on the other hand, with a releasing chamber 239 of the first brake means 10 through conduits 75 and 75b. The port 223 communicates with the port 178 of the manual valve assembly 102 through conduit 70 (refer also to FIG. 3B).

With reference now made to FIG. 3D, the 1-2 shift valve assembly 105 illustrated in the drawing is adapted for change between first and second speed ratios of the transmission, operating to disengage the second brake means 11 when the first brake means 10 is engaged, and vice versa. As illustrated the 1-2 shift valve assembly comprises valve pistons 122 and 123. The piston 122 serves as a substantial plug, in effect, having lands 122a and 122b of different diameters. The other piston 123 includes a land 123d of the largest diameter, lands 123b and 123c of the same diameter smaller than that of the land 123d, and a land 123a of the smallest diameter. The land 122b of the piston 122 is smaller in diameter than the land 123a of the piston 123. A spring 124 is installed between the land 123d of the piston 123 and a stationary portion of the valve assembly in order to urge the piston 123 toward the piston 122.

The 1-2 shift valve assembly 105 further includes ports 193,195 197, 199, 201, 202, 203, 204 and 205, and chambers 194, 198, 200, 206 and so forth. The ports 199 and 203 leads to the sump 50. The port 193 leads to the port 176 of the manual valve assembly 102 through conduit 68 (refer also to FIG. 3B). The ports 195 and 205 are intercommunicated through conduits 69a and 69b, and further leads to the port 177 of the manual valve assembly 102 through the conduit 69 that is connected to the conduits 69a and 69b (refer again to FIG. 3B). The port 197 leads to the intercommunicated ports 215 and 217 of the aforedescribed 2-3 shift valve assembly 107 through conduits 73, 73a and 73b (refer to FIG. 3C). The chamber 200 is merely formed for machining purposes. The port 201 leads to the port 173 of the manual valve assembly 102 through conduits 63b and 63 (refer to FIG. 3B). (As seen in FIG. 3B, this conduit 63 also is in open communication with conduits 63 a and 59, the conduit 63a communicating with an actuating and releasing chamber 231 of the first clutch means 8, as in FIG. 3C, and the conduit 59 communicating with the port 163 of the pressure regulator valve assembly 103, as in FIG. 3A.) The port 202 leads to the port 207 open to the actuating chamber 236 of the first brake means 10 through conduit 72 (refer to FIG. 3C). The port 204 leads to the port 240 open to actuating and releasing chamber 242 of the second brake means 11 through conduit 71.

The first pressure reducing valve assembly 98, as also illustrated in FIG. 3D, includes a piston 125 having lands 125a and 125b, a spring 208 pressing the piston 125 leftward as viewed in the drawing, and ports 255, 256, 257 and 258. The port 255 communicates with conduit 75c and thence to the aforesaid conduit 75 leading to the chamber 234 of the second clutch means 9 and to the releasing chamber 239 of the first brake means 10 (refer also to FIG. 3C). The port 256 communicates with conduit 72b and thence to the aforesaid conduit 72 which leads to the actuating chamber 236 of the first brake means 10 (refer again to FIG. 3C). The port 257 leads through conduit 77 to port 261 of the second pressure reducing valve 99 hereinafter described. The port 258 leads to the sump 50 for fluid discharge.

The second pressure reducing valve assembly 99 shown below the first pressure reducing valve assembly 98 in FIG. 3D is of similar construction, comprising a piston 126 having lands 126a and 126b and a compression spring 209 urging the piston 126 rightward in the drawing. It is important that this compression spring 209 be slightly more resistive than the spring 208 of the first pressure reducing valve assembly 98. The second pressure reducing valve assembly 99 further includes ports 259, 260, 261 and 262. The ports 259 and 262 leads to the sump 50. The port 260 communicates through conduit 75d to the aforesaid conduit 75c, like the port 255 of the first pressure reducing valve assembly 98.

Proceeding now to the description of a mode of operation of the foregoing hydraulic control system in connection with the automotive transmission of FIG. 1, it may be firstly stated that the pressure regulator valve 103 operates to regulate the line pressure of the conduit 57, FIGS. 3A, 3B, etc., and the related conduits to predetermined maximum values for all the conditions of the transmission and the hydraulic control system. The front pump 100 serves as a source of hydraulic pressure for the pressure regulator valve assembly 103, etc., while the motor vehicle is at rest only with its engine 5 left in operation or is running at low speed. The check valve 109 is kept open by the hydraulic pressure supplied from the conduit 53b (see FIG. 3A), while the pressure within the conduit 57 keeps the other check valve 110 closed (see FIG. 3D), so that there is no possibility of fluid escape through the rear pump 101.

The rear pump 101 is set in operation as the vehicle starts moving. When the vehicle speed exceeds a certain value, the hydraulic pressure delivered by the rear pump 101 overcomes the line pressure and the resistance of the spring 136 thereby opening the check valve 110. The check valve 109 is then closed by the line pressure due to the operation of the rear pump 101. The sole source of hydraulic pressure for the conduit 57 in this instance is the rear pump 101. The fluid delivered then by the front pump 100 flows through a closed circuit including the conduits 53 and 53a, ports 159 and 158, conduit 56 and inlet conduit 52, developing no substantial in the meantime (refer to FIG. 3A).

With reference to FIG. 3A, the pressure regulator valve 103 regulates the pressure delivered by the front pump 100 between the upper edge of its projection 208 and the lower edge of the land 45a, and the pressure delivered by the rear pump 101 between the upper edge of the projection 209 and the lower edge of the land 45b. Generally speaking, therefore, the thus regulated pressure of the rear pump 101 is slightly higher than the similarly regulated pressure of the front pump 100. The pressure rendered lower than the line pressure is fed out of the orifice 170 at the port 160 to the torque converter 7 through the conduit 54. The torque converter 7 communicates with a lubricating check valve assembly 111 through conduit 55 whereby the hydraulic pressure within the torque converter 7 is kept constant. A ball 139 of this check valve assembly 111 is urged by means of a compression spring 138 in the direction to close the conduit 55. A port 212 leads to various working parts of the transmission for lubrication purposes.

For all the cases of forward drive, line pressure is supplied to the chamber 164 of the pressure regulator valve 103 from the port 173 of the manual valve 102 through the conduit 59, and the line pressure regulation is effected in the condition where the pressure applied to the difference between the effective areas of the lands 45c and 45d plus the effective area of the land 45d, that is, to the overall effective area of the land 45c, balances with the resistance offered by the compression spring 117. When the valve piston 114 of the manual valve 102 is in the position N, R or P, the conduit 59 is disconnected from the line pressure conduit 57 (see FIG. 3B), so that the pressure within the chamber 164 of the pressure regulator valve 103 is exhausted. Accordingly, only the pressure within the valve chamber 165 (i.e., the pressure applied to the difference between the effective areas of the lands 45c and 45d) balances with the resistance offered by the spring 117, so that the line pressure in these cases is higher than that in the event of forward drive. The line pressure is further varied by the supply to and discharge from the uppermost valve chamber 168 of the fluid from the throttle valve 104.

It is the throttle relay valve 108, FIG. 3C, that determines such supply or discharge of the fluid from the throttle valve 104. This throttle relay valve 108 operates depending upon the relationship between the resistive force of its spring 132 and the difference between the regulated pressure of the speed-sensitive governor valve 113 (hereinafter referred to as "governor pressure") and the regulated pressure of the throttle-sensitive throttle valve 104 (hereinafter referred to as "throttle pressure"). Hence, in the low speed ratio condition of the transmission, the line pressure is kept high in response to the throttle opening while the accelerator pedal 25 is depressed. Such high pressure is necessary for the friction engaging devices of the transmission to convey the high torque delivered by the vehicle engine upon depression of the accelerator pedal.

As the motor vehicle sufficiently picks up speed, however, the governor pressure increases; the 1–2 shift valve 105 is set in its higher-speed side position; the line pressure is supplied to the throttle relay valve 108; and the supply of the throttle pressure to the pressure regulator valve 103 is shut off by the same. The line pressure is thus reduced. This pressure reduction is desirable in view of the fact that as the motor vehicle attains a sufficiently high speed, the transmission is required to convey a comparatively small amount of torque.

The governor pressure provided by the governor valve 113, FIG. 1, varies with change in the centrifugal forces induced in the governor weight 245 and 246 and the piston 251. In all forward speed ratio conditions of the transmission, the pressure delivered by the rear pump 101 is supplied to the port 253 of the governor valve 113 through the orifice 167 and conduits 62 and 62a (refer also to FIG. 3D). The casing 243 of the governor valve 113 rotates with the output shaft 2, and when the vehicle speed is comparatively low, hydraulic pressure in accordance with the difference between the centrifugal forces imparted to the governor weigts 245 and 246 and the valve piston 251 is subjected to the difference between the effective areas of the lands 251a and 251b of the valve piston 251. As the vehicle speed grows sufficiently high, however, the outer governor weight 245 is centrifugally displaced outward against the action of the spring 248 to be received by snap ring 244. Now the hydraulic pressure applied to the valve piston 251 is counteracted by the centrifugal action of the inner governor weight 246 and the resistive force of the spring 248 which is being compressed by the outer governor weight 245 as mentioned above. Hence, the overall centrifugal force acting on these governor weights 245 and 246 varies in two stages, as does the governor pressure.

Referring to FIG. 3B, the accelerator pedal 25 is caused to act on the piston 120 of the throttle valve 104 through the piston 118 of the downshift valve 26 to provide throttle pressure in the conduit 64. This throttle pressure is variable between a level close to zero and that equal to the line pressure of the conduit 57. The line pressure is applied to the throttle valve 104 through the conduits 58 and 58b to provide a pressure depending upon the difference between the resistive forces of the springs 119 and 121. This throttle pressure enters the conduit 64 from the port 185 and thence to the throttle relay valve 108 via the conduit 65 and to the chamber 214 of the 2–3 shift valve 107 via the conduit 67 (refer also to FIG. 3C). Orifice 188 at the port 187 of the throttle valve 104 is formed to prevent undesired oscillation of the valve piston 120.

Described hereinbelow are the operations of the hydraulic control system of the present invention in the respective speed ranges of the transmission.

Neutral Range

A shift lever (not shown) is manually operated to set the manual valve 102, FIG. 3B, to the position N, whereupon the line pressure supplied thereto from the conduit 57 through the ports 174 and 175 is shut off by the lands 114b and 114c of the valve piston 114, so that no hydraulic pressure is delivered to the other valves or to the friction engaging devices. The transmission is thus held in neutral.

Low Range

When the shift lever is operated to set the manual valve 102 to the position L, the line pressure of the conduit 57 is directed, on one hand, from the port 175 between the lands 114b and 114c to the ports 176 and 177 and, on the other hand, from the port 174 between the lands 114c and 114d to the port 173. The line pressure that has been thus directed into the port 176 passes through the conduit 68 to enter the lowermost chamber 194 of the 1–2 shift valve 105, FIG. 3D, from its port 193. From the port 177 the pressure passes through the conduits 69 and 69a and enters the chamber 196 of the 1–2 shift valve 105 from its port 195. Also from the conduit 69, the pressure out of the same port 177 passes through the conduit 69b to reach the port 205. The pressures within the valve chambers 194 and 196 move the valve pistons 122 and 123 up-ward, as viewed in FIG. 3D, against the action of the spring 124 and thus keep these valve pistons in the first or low range position of the 1–2 shift valve 105. By this upward movement of the valve piston 123, the port 205 is communicated with the port 204 so that the line pressure is delivered to the chamber 242 of the second brake means 11. From the port 173 the line pressure goes, on one hand, through the conduits 63 and 63a to reach the chamber 231 of the first clutch means 8, FIG. 3C, and, on the other hand, through the conduits 63 and 63b to be cut off by the lands 123a and 123b of the piston 123 of the 1–2 shift valve 105, FIG. 3D.

The line pressure that has come to the port 182 of the downshift valve 26, FIG. 3B, through the conduits 58 and 58a is normally cut off by the land 118b of its valve piston 118. (This port 182 communicates with the port 181 in event of a so-called "kickdown.") The line pressure in the conduit 57 is also applied to the throttle valve 104 through the conduits 58 and 58b and the port 186. The throttle pressure thus delivered from the port 185 is directed through the conduit 64, check valve 112 and conduit 67 to reach the port 213 open to the chamber 214 of the 2–3 shift valve 107, FIG. 3C. In event the governor pressure in the chamber 206 is comparatively low, this chamber 214 communicates with the port 215, so that the throttle pressure reaches the port 217 of the same 2–3 shift valve through the conduits 73b and 73a. In this instance, however, the pressure within the conduit 73b and 73a is smaller than the throttle pressure by the amount corresponding to the resistive force of the spring 128, and is directed through the conduit 73 to the port 197 open to the chamber 198 of the 1–2 shift valve 105, FIG. 3D. This pressure (hereinafter referred to as regulated throttle pressure) serves to keep the valve piston 123 of the 1–2 shift valve in its first or low range position.

In this manner the first clutch means 8 and the second brake means 11 operate, with the revolution of the support 27 thereby being arrested, and the transmission provides its first or low speed ratio (refer to FIG. 1). The aforesaid throttle pressure is also directed through the conduit 65 to the throttle relay valve 108, FIG. 3C. When the vehicle is running at comparatively low speed and with similarly low governor pressure, the valve pistons 130 and 131 of the throttle relay valve 108 are in the illustrated condition, so that this pressure is further conveyed therefrom through the conduit 66 to the chamber 168 of the pressure regulator valve 103, FIG. 3A. It is because of this arrangement that the hydraulic pressure regulated by the pressure regulator valve 103, that is the line pressure, varies in response to the throttle pressure. Such variable line pressure is desirable in view of the fact that when the engine throttle opening is augmented, correspondingly elevated line pressure is available for actuation of the clutches or bands of the transmission.

While, referring to FIG. 1, the one way clutch 29 retains the support 27 immovable in one predetermined direction (opposite to the direction of the turning force applied to the support in the first or low speed range condition), the second brake means 11 completely arrests the revolution of the same support. This is important for obtaining the desired engine brake effect, as so called, during vehicle run in the low speed range.

Due to the hydraulic pressure acting upon the difference between the effective areas of the lands 123d and 123c of the 1–2 shift valve 105, FIG. 3D, and the pressures applied to the chambers 198, 196 and 194, the valve pistons 122 and 123 are urged to and held in its first or low speed range position (upward in the drawing) against the governor pressure within the chamber 206. As a result, the transmission provides its low speed ratio until the shift lever is operated to reposition the manual valve 102.

Range 2

As the manual lever 102, FIG. 3B, is moved to its position 2 by means of the shift lever, the land 114b comes to the projection 212 between the ports 176 and 177 thereby disc connecting the ports 175 and 177. The other line pressure circuit details are the same as those in the precedingly described low range condition. Because of the absence of line pressure from the conduits 69, 69a and 69b, no pressure is now applied to the chamber 196 or to the difference between the effective areas of the lands 123c and 123d of the piston 123 of the 1–2 shift valve 105, FIG. 3D. As the vehicle speed increases, therefore, the correspondingly elevated governor pressure in the chamber 206 causes the valve pistons 122 and 123 to go downward as viewed in the drawing, that is, toward the second or intermediate speed range position. Thereupon the line pressure from the port 102 that has been cut off by the lands 123a and 123b of the valve piston 123 is permitted to enter the port 202 and thence the actuating chamber 236 of the first brake means 10, FIG. 3C, through the conduit 72. The same line pressure is also delivered to the port 256 of the pressure reducing valve 98, FIG. 3D, through the conduit 72b.

In this manner, when the vehicle speed is low, the line pressure is only applied to the first clutch means 8 and, as already mentioned, the one way clutch 29 operates to provide the low speed ratio. As the vehicle speed increases, the 1–2 shift valve 105 shifts to its second position with the result that the line pressure is delivered to the respective chambers 231 and 236 of the first clutch means 8 and the first brake means 10 to provide the second or intermediate speed ratio.

Rapid depression of the accelerator pedal 25 while the vehicle is running in this second or intermediate speed range results in no substantial change in the governor pressure of the chamber 206 but in the rapid elevation of the aforesaid regulated throttle pressure in the valve chamber 198 (refer to FIG. 3D). This elevated pressure, plus the line pressure delivered to the valve chamber 194, overcomes the combined forces of the spring 124 and the governor pressure in the chamber 206 to shift the valve pistons 122 and 123 upward in the drawing or to its low speed range position. The ports 201 and 202 are now disconnecting by the land 123b of the valve piston 123, whereas the latter port 202 communicates with the discharge port 203 through the groove between the lands 123b and 123c. As a consequence, the first brake means 10 is disengaged, and the one way clutch 29 operates to provide the desired first or low speed ratio.

As the motor vehicle again picks up speed in the above obtained low speed ratio condition, the governor pressure within the chamber 206 may gradually rise to a degree enough to press the pistons 122 and 123 of the 1-2 shift valve 105, FIG. 3D, downward in the drawing or toward its second or intermediate speed range position. Automatic shift is thus possible between the first and second speed ratios as long as the manual valve 102 is in its position 2.

Drive Range

With the manual valve 102, FIG. 3B, moved to its position D by the shift lever, the line pressure in the conduit 57 is directed through the conduit 57a, the port 174, the groove between the lands 114c and 114d of the valve piston 114, the port 172 and the conduit 74. The port 176 which has been in communication with the port 175 is now disconnected therefrom by the land 114b and, instead communicates with the discharge port 178, thereby the fluid in the chamber 194 of the 1-2 shift valve 105 being discharged. Other details follow suit after those in case the manual valve 102 is set in its position 2.

The line pressure that has been thus admitted into the conduit 74 is guided to the port 220 of the 2-3 shift valve 107, FIG. 3C. When the vehicle runs at comparatively low speed, with correspondingly low governor pressure, the valve piston 129 is held in its upward or lower speed position by the spring 128, so that the port 220 is caught between the lands 129b and 129c of the valve piston 129. As the vehicle speed increases, however, the governor pressure within the chamber 206 is elevated to an extent sufficient to overcome the combined forces of the spring 128 and the throttle pressure within the valve chamber 214. The valve pistons 129 and 127 are then lowered to the higher speed position with the result that the line pressure from the conduit 74 is directed through the port 220, the groove between the lands 129c and 129d of the valve piston 129, and the port 222. The pressure thus admitted into the conduit 75 is delivered, on one hand, through the conduit 75a to the chamber 234 of the second clutch means 9 and, on the other hand, through the conduit 75b to the releasing chamber 239 of the first brake means 10, thereby bringing the second clutch means 9 into, and the first brake means 10 out of, engagement. The third or high speed ratio is obtained as the first clutch means 8 and the second clutch means 9 are both actuated into engagement.

The line pressure admitted into the conduit 75 as above is also delivered through the conduit 75c to the chamber 261 of the pressure reducing valve 98 and the chamber 262 of the pressure reducing valve 99, FIG. 3D. Upon initiation of transition from the first brake means 10 to the second clutch means 9 as above, the piston 125 of the valve 98 moves against the action of the spring 208 in the right hand direction as seen in FIG. 3D, so that its piston 125 communicates the port 257 with the port 256. At this moment the piston 126 of the other valve 99 is still held in its illustrated position by means of the spring 209. Hence the actuating chamber 236 of the first brake means 10, FIG. 3C, communicates with the discharge port 259 of the valve 99 through the valve 98, so that the hydraulic pressure within the chamber 236 is reduced.

As the pressures within the chamber 234 of the second clutch means 9 and the releasing chamber 239 of the first brake means 10 are further elevated, the similarly elevated pressure within the chamber 262 of the pressure reducing valve 99 causes the valve piston 126 to move leftward as viewed in FIG. 3D against the action of the spring 209 and hence to close the discharge port 259 with its land 126a. Thereupon the pressure within the actuating chamber 236 of the first brake means 10 is again elevated to the level of the line pressure. Simultaneously, however, the pressures within the chamber 234 of the second clutch means 9 and the releasing chamber 239 of the first brake means 10 are also elevated up to the line pressure. By suitably presetting the resistances to be offered by the springs 208 and 209 of the pressure reducing valves 98 and 99, smooth transition is accomplished from the first brake means 10 to the second clutch means 9.

When the vehicle is running at comparatively low speed with correspondingly small governor pressure while the manual valve 102 is set in its position D, the piston 129 of the 2-3 shift valve 107, FIG. 3C, is positioned in its lower speed positioned by the combined forces of the spring 128 and the throttle pressure within the valve chamber 214. On the other hand, the piston 123 of the 1-2 shift valve 105, FIG. 3D, is held in its higher speed position by means of the spring 124. As in the above described case of Range 2 the line pressure is delivered to the first clutch means 8 and the first brake means 10 to provide the second or intermediate speed ratio.

As the vehicle speed increases, the correspondingly elevated governor pressure causes the pistons 129 and 127 of the 2-3 shift valve 107, FIG. 3C, to move downward in the drawing or toward its higher speed position thereby actuating the second clutch means 9. Also, the line pressure is delivered therefrom to the releasing chamber 239 of the first brake means 10 against the line pressure within its actuating chamber 236. The first brake means 10 is thus brought out of engagement by the action of the spring 152. The first clutch means 8 and the second clutch means 9 are now both engaged to provide the third or high speed ratio.

For a downshift from the third to second speed, too, the pressure reducing valves 98 and 99 operate to instantaneously lower the hydraulic pressure within the actuating chamber 236 of the first brake means 10 at the moment when the pressures within the chamber 234 of the second clutch means 9 and the releasing chamber 239 of the first brake means 10 are being reduced, thereby ensuring smooth transition from the second clutch means 9 to the first brake means 10.

While the vehicle is running at less than a certain speed (e.g., 40 km/h) in the second speed range with the manual valve 102 set in the position D, rapid depression of the accelerator pedal 25 results in a sharp rise of the throttle pressure whereby the regulated throttle pressure in the chamber 198 of the 1-2 shift valve 105, FIG. 3D, rapidly rises to overcome the combined forces of the spring 124 and the governor pressure in the chamber 206 and hence to move the valve piston 123 to its illustrated lower speed position. The ports 63b and 72 of this 1–2 shift valve 105 are now disconnected by the land 123b of the valve piston 123 so that the line pressure which has been keeping the first brake means 10 in engagement is exhausted through the port 203. Only the first clutch means 8 of the transmission is now left in engagement, which first clutch means cooperates with the one way clutch 29 to provide the first or low speed ratio.

During vehicle run at less than a certain speed (e.g., 80km/h) in the third speed range with the manual valve set in the position D, rapid depression of the accelerator pedal 25 causes the correspondingly oridyced throttle pressure to move the piston 129 of the 2–3 shift valve 107, FIG. 3C, to its illustrated lower speed position against the governor pressure in the chamber 206. When the throttle pressure is still higher, and when the vehicle speed is lower, not only is the 2–3 shift valve 107 repositioned as mentioned above, but the piston 123 of the 1–2 shift valve 105, FIG. 3D, is moved to its illustrated lower speed position because the regulated throttle pressure in its valve chamber 198 overcomes the combined forces of the spring 124 and the governor pressure in the chamber 206. The kickdown to the second or first speed is thus accomplished depending upon vehicle speed and the degree of depression of the accelerator pedal 25.

In this drive range condition, too, the line pressure is at substantially constant low level when the governor pressure in the chamber 206 is comparatively high while the throttle pressure in the chamber 226 of the throttle relay valve 108, FIG. 3C, is comparatively low. When the governor pressure in the chamber 206 is smaller than the sum of the throttle pressure in the chamber 226 and the force of the spring 132 of the throttle relay valve 108, the line pressure (which is at a higher level than in the preceding condition) is variable in response to throttle opening.

Manual Downshift

The transmission incorporating the novel features of the present invention can be manually downshifted from its high speed ratio (in which case the manual valve 102 is set in the position D) to intermediate or low speed ratio by resetting the manual valve to the position 2 or L, and also from its intermediate speed ratio (only in case the manual valve has been set in the position 2) to low speed ratio by resetting the manual valve to the position L. However, a manual downshift from either position D or position 2 to position L is subject to limitations in that the transmission is prevented from transition to its low speed ratio in event it is unable to check the overspeed of the engine 5.

When the manual valve 102 has been set in the position D or 2, with the transmission in its high or intermediate speed ratio, a manual downshift to the position L with a view to obtaining an engine brake effect is generally made with the accelerator pedal 25 returned to its closed throttle position. The regulated throttle pressure in the chamber 198 of the 1–2 shift valve 105, FIG. 3D, then approximates zero. As a result, the combined forces of the spring 124 and the governor pressure in the chamber 206, tending to press the valve pistons 122 and 123 downward as seen in the drawing, are only counteracted by the line pressures in the valve chambers 194 and 196 (e.g., the product of the line pressure and the cross sectional area of the land 122b). If the combined forces of the spring 124 and the governor pressure exceed the latter, that is if the vehicle speed is more than a certain value, no downshift occurs but the 1–2 shift valve 105 remains in its higher speed position. As the vehicle speed decreases, the valve pistons 122 and 123 of the 1–2 shift valve 105 are made to move upward or to its lower speed position to provide a low speed ratio.

Reverse Range

When the manual valve 102, FIG. 3B, is set to the position R by means of the shift lever, line pressure is admitted into its ports 176, 177 and 178. The line pressure from the port 176 is directed through the conduit 68 to reach the chamber 194 of the 1–2 shift valve 105, FIG. 3D, and therein cooperates with the line pressure which has been supplied to the chamber 196 from the port 177 to hold the valve pistons 122 and 123 in their lower speed position. The line pressure from the port 177 is also directed through the ports 205 and 204 of the same valve 105 into the chamber 242 of the second brake means 11 thereby to bring the same into engagement. From the port 178 the line pressure goes through the conduit 70 to reach the port 223 of the 2–3 shift valve 107, FIG. 3C. Further coming out of its port 222, the line pressure is delivered, on the one hand, to the chamber 234 of the second clutch means 9 through the conduits 75 and 75a and, on the other hand, to the releasing chamber 239 of the first brake means 10 through the conduits 75 and 75b, thereby engaging the former and disengaging the latter. In this instance the chamber 231 of the first clutch means 8 is in communication with the discharge port 171 of the manual valve 173, FIG. 3B, through the conduits 63a and 63 and the port 172 so that the first clutch means 8 is disengaged. Only the second clutch means 9 and the second brake means 11 are now engaged to provide a reverse drive.

While in the aforementioned forward drive conditions, the line pressure from the port 173 of the manual valve 102 is always applied to the chamber 164 of the pressure regulator valve 103, FIG. 3A, through the conduit 59 and the port 163. In this reverse drive condition, the port 173 is blocked from the line pressure conduit and, instead, is communicated with the discharge port 171, so that the line pressure in the chamber 164 of the pressure regulator valve 103 is exhausted. The force of the spring 117 of the pressure regulator valve 103 is now counteracted only by the line pressure acting upon the difference between the effective areas of the lands 45c and 45d of the valve piston 45. The line pressure being thus applied to the smaller area than in the case of forward drive, it follows that the line pressure in the present condition is correspondingly greater. This great line pressure is required for actuating the second clutch means 9 and teh second brake means 11 to an extent enough to convey large amounts of torque while the transmission provides its reverse speed ratio.

Inasmuch as the output shaft 2 rotates in the reversed direction, the rear pump 101 becomes inoperative so that fluid is not pumped into the conduit 61 and 62 (refer to FIG. 3D). The pressure regulator valve 113 does not operate, nor is any governor pressure produced. Hydraulic pressure in the chamber 206 being substantially nonexistent, the pistons 122 and 123 of the 1-2 shift valve 105 have only the spring 124 exercising its downward pressure, whereas no such downward pressure works in the 2-3 shift valve 107, FIG. 3C, so that its valve piston 129 is held in its lower speed position by the spring 128.

I claim:

1. In a speed changing device comprising an input shaft, an output shaft, a plurality of selectively employable power trains between said input shaft, and at least first and second friction engaging means adapted respectively for completing a lower and a higher speed ratio power train through the speed changing device, said first friction engaging means having an actuating chamber and a releasing chamber, and said second friction engaging means having an actuating chamber, a hydraulic control system for said speed changing device comprising a source of fluid pressure, a first passage for hydraulically connecting said source of fluid pressure to said actuating chamber of said first friction engaging means, a second passage for hydraulically connecting said source of fluid pressure to said releasing chamber of said first friction engaging means and to said actuating chamber of said second friction engaging means, shift valve means positioned in said first and second passages for controlling said first and second passages so as to selectively engage and disengage said first and second friction engaging means in order to establish a desired power train, a third fluid passage between said actuating chamber of said first friction engaging means and a point of fluid discharge, pressure reducing valve means disposed in said third fluid passage for on-off controlling the same, said pressure reducing valve means comprising a first pressure reducing valve and a second pressure reducing valve, and a fourth fluid passage for directing to said first and second pressure reducing valves the fluid pressure being delivered to said releasing chamber of said first friction engaging means and to said actuating chamber of said second friction engaging means, said first pressure reducing valve being urged so as to open said third fluid passage by the fluid pressure in said fourth fluid passage when the fluid pressure in said fourth fluid passage reaches a first predetermined value and said second pressure reducing valve being urged so as to close said third fluid passage by the fluid pressure in said fourth fluid passage when the fluid pressure in said fourth fluid passage reaches a second predetermined value.

2. The hydraulic control system according to claim 1, in which said first pressure reducing valve is adapted to control said third fluid passage extending between said actuating chamber of said first friction engaging means and said second pressure reducing valve, and said second pressure reducing valve is adapted to control said point of fluid discharge included in said third fluid passage.

3. The hydraulic control system according to claim 2, in which each of said first and second pressure reducing valves includes a spring member to offer resistance against the fluid pressure delivered by said fourth fluid passage, the resistive force of said spring member of said first pressure reducing valve being smaller than the resistive force of said spring member of said second pressure reducing valve.

4. The hydraulic control system according to claim 2, in which said first pressure reducing valve comprises a piston member slidably received in a bore and having at least two lands, a first fluid chamber on one side of said piston member communicating with the said fourth fluid passage, a second fluid chamber between said lands of said piston member, and a third fluid chamber on the other side of said piston member accommodating a spring member which is adapted to offer resistance against the fluid pressure applied to said piston member from said fourth fluid passage, and said second pressure reducing valve comprises a piston member slidably received in a bore and having at least two lands, a first fluid chamber on one side of said piston member communicating with said fourth fluid passage, a second fluid chamber between said lands of said piston member, and a third fluid chamber on the other side of said piston member accommodating a spring member which is adapted to offer resistance against the fluid pressure applied to said piston member from said fourth fluid passage.

5. The hydraulic control system according to claim 4, in which said third fluid passage includes said actuating chamber of said first friction engaging means, said second fluid chamber of said first pressure reducing valve, said second fluid chamber of said second pressure reducing valve, and said point of fluid discharge.

6. The hydraulic control system according to claim 1, in which said shift valve means is so arranged that when the same is set in a position to complete a lower speed ratio, the fluid pressure from said source is delivered to said actuating chamber of said first friction engaging means through said first passage, and that when said shift valve means is set in a position to establish a higher speed ratio, the fluid pressure is delivered to said releasing chamber of said first friction engaging means and to said actuating chamber of said second friction engaging means through said second passage.

7. The hydraulic control system according to claim 6, in which said shift valve means is associated with a second valve means operated in accordance with the relationship between the pressure regulated by throttle valve means responsive to the throttle opening of an engine coupled to said input shaft of said speed changing device and the pressure of governor valve means fixedly mounted on said output shaft of said speed changing device so as to be responsive to the speed of rotation of said output shaft.

* * * * *